(12) United States Patent
Nagashima et al.

(10) Patent No.: US 7,604,767 B2
(45) Date of Patent: Oct. 20, 2009

(54) SIDE GATE TYPE INJECTION MOLDING DIE AND MOLDED COMPONENT MANUFACTURING METHOD USING THE SAME

(75) Inventors: Hiroaki Nagashima, Hamamatsu (JP); Hisashige Uebayashi, Hamamatsu (JP)

(73) Assignee: Suzuki Motor Corporation (JP)

( * ) Notice: Subject to any disclaimer, the term of this patent is extended or adjusted under 35 U.S.C. 154(b) by 0 days.

(21) Appl. No.: 12/190,778

(22) Filed: Aug. 13, 2008

(65) Prior Publication Data

US 2009/0057956 A1    Mar. 5, 2009

(30) Foreign Application Priority Data

Aug. 29, 2007    (JP) .............................. 2007-222310

(51) Int. Cl.
*B29C 45/18*    (2006.01)
(52) U.S. Cl. .................... 264/328.1; 425/542
(58) Field of Classification Search ................. 425/127, 425/129.1, 567–573
See application file for complete search history.

(56) References Cited

U.S. PATENT DOCUMENTS 5,252,280 A * 10/1993 Motisi .................. 264/161

FOREIGN PATENT DOCUMENTS

| JP | 58-181516 | 12/1983 |
|---|---|---|
| JP | 08-041284 | 2/1996 |
| JP | 08-239505 | 9/1996 |
| JP | 2001-347546 | 12/2001 |
| JP | 2006-116894 | 5/2006 |

OTHER PUBLICATIONS

Japanese Office Action corresponding to Japanese Patent Application No. 2007-222310 dated Oct. 5, 2007.

* cited by examiner

*Primary Examiner*—Khanh Nguyen
*Assistant Examiner*—Margaret Brodie
(74) *Attorney, Agent, or Firm*—Myers Bigel Sibley & Sajovec, PA (57) ABSTRACT

A side gate type injection molding die prevents a weld line from being generated on a molded component made of a resin material to which a brightening agent is added, avoiding inferior appearance. The side gate type injection molding die including a product portion 7, which is a space for molding, and a side gate 8, which is used to inject the material into the product portion 7, in which the side gate 8 is formed so as to have a rectangular transverse cross section in a contact part 9 between the product portion 7 and the side gate 8, is configured so that at least one of corner parts 9e of the transverse cross section formed into a rectangular shape in the contact part 9 of the side gate 8 is formed in a curved shape; and the resin material to which the brightening agent is added is injected into the product portion 7 from the side gate 8 to manufacture a molded component 1.

4 Claims, 5 Drawing Sheets

SIDE GATE TYPE INJECTION MOLDING DIE AND MOLDED COMPONENT MANUFACTURING METHOD USING THE SAME

CROSS-RELATED APPLICATIONS

This application claims priority from Japanese Patent Application No. 2007-222310; filed Aug. 29, 2007, the disclosure of which is incorporated herein by reference in its entirety.

FIELD OF THE INVENTION

The present invention relates to a side gate type injection molding die for manufacturing molded components made of a resin material to which a brightening agent is added, and further relates to a molded component manufacturing method using the above-mentioned injection molding die.

BACKGROUND OF THE INVENTION

Conventionally, the surface of a resin molded component has been painted or plated so as to be provided with a surface so as to provide a metallic appearance and a bright appearance. Such a molded component may also be used as a design element in a vehicle, and a typical example thereof is an interior door handle provided in the cabin interior of a vehicle door. In recent years, however, the use of volatile organic compounds used in painting, etc., is required to be decreased because these compounds are environmental pollutants. Therefore, for example, a molded component having a metallic appearance may be manufactured by using a material to which a brightening agent such as aluminum powder or mica powder is added.

It is generally thought that a submarine gate type injection molding die may be used as a die for manufacturing the above-described molded component because the gate cut can be performed automatically. The injection molding die includes a gate for injecting material and a product portion for molding, and the gate and the product portion are connected to each other. Therefore, the manufactured molded component includes a gate portion formed by a resin material filled into the gate and a body portion formed by a resin material filled into the product portion, and the gate portion and the body portion are formed integrally. After injection molding, the gate portion becomes unnecessary, and so the gate portion must be cut from the body portion. To cut the gate portion from the body portion, a so-called gate cut for cutting the gate portion is performed. For the submarine gate type injection molding die, the gate cut is performed automatically by using the force of an ejector pin provided to remove the molded component from the die.

The gate portion is formed so as to have a cross-sectional area that is as small as about 0.0007-1.1301 mm$^2$, so that the gate portion can be cut easily. However, this small cross-sectional area restricts the quantity of filling resin material into the product portion, so that a problems such as a short shot or a sink mark may be liable to occur. Furthermore, there arises a problem in that this die cannot be applied to a large component requiring a large filling amount of material. Also, another problem arises in that since a shearing force is applied to around the gate portion of the molded component itself at the time of cutting of the gate portion, jetting, silver streaking, and the like occur around the gate portion of the molded component, which may result in inferior appearance. In addition, there arises a problem in that the inferior appearance may be pronounced when a molding material to which a brightening agent is added is used.

Accordingly, to prevent the occurrence of jetting and silver streaking, it is thought that the gate cut may be performed manually with high accuracy, instead of being performed automatically. In this case, a side gate type injection molding die is mainly used. The side gate type injection molding die is formed so that the cross-sectional area of the gate portion is larger than that of the submarine gate type injection molding die. Therefore, the filling amount of material at the time of injection increases, so that a problem such as a short shot and a sink mark is less liable to occur, which offers an advantage that the die can be applied to a larger component.

Figure 7:
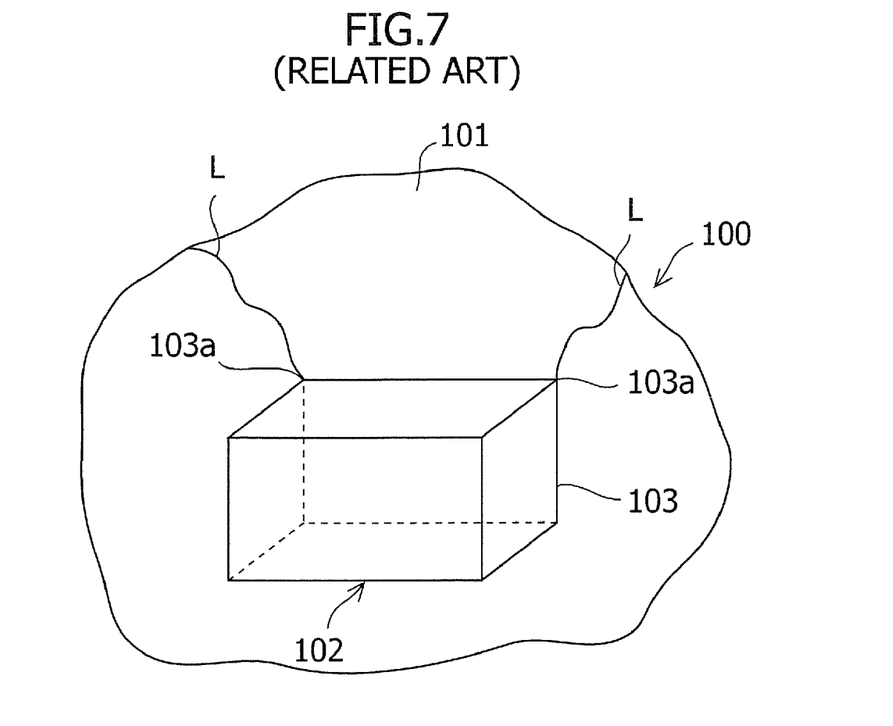
FIG. 7 is an enlarged view showing weld lines generated around a gate portion of a general molded component.

On the other hand, the side gate type injection molding die has a problem of generating a weld line L. FIG. 7 shows, in enlargement, the outline of a gate remnant of a gate portion 102 provided on a body portion 101 of a general molded component 100. The feature is such that a resin material passes through the gate portion 102 and thereby the body portion 101 is injection molded. The gate portion 102 is connected to the body portion 101 by a contact part 104, and the contact part 104 has a substantially rectangular cross section. The weld line L originates from a corner part 104a of the cross section of the contact part 104 of the molded component 100 so as to extend radially.

Such a weld line L is generated in the case in which the resin materials flowing from different directions collide with each other in a part near the corner part 104a, and these resin materials do not mix with each other. In the case in which a conventional resin material, to which no brightening agent is added, is used, the colliding resin materials mix with each other, so that the weld line L is barely generated. However in the case in which the resin material to which a brightening agent is added is used, the brightening agent added to the colliding resin materials is oriented, and therefore the resin materials do not mix with each other, so that the weld line L is generated. The generation of such a weld line L presents a problem in that the appearance of the molded component 100 is degraded remarkably by the weld line L and the strength of the molded component 100 becomes insufficient in a part where the weld line L is generated.

To suppress the generation of the weld line, measures are taken regarding the material. In Japanese Unexamined Patent Application Publication No. 8-41284, the generation of the weld line is suppressed by selecting the shape and grain diameter of the brightening agent added to the resin material. Also, in Japanese Unexamined Patent Application Publication No. 8-239505, the generation of the weld line is suppressed by selecting the grain diameter and addition amount of brightening agent and by adding titanium oxide, lead oxide, zinc oxide, or antimony oxide, as a weld eliminating agent.

However, for the measures disclosed in Japanese Unexamined Patent Application Publication No. 8-41284 and Japanese Unexamined Patent Application Publication No. 8-239505, the shape, the grain diameter, and the addition amount of the brightening agent are restricted, and the appearance such as bright appearance and metallic appearance is limited by this restriction. Therefore, it is difficult to obtain a color tone having good metallic appearance as a substitute for painting and plating having a good appearance. Furthermore, the generation of the weld line is not prevented completely, and the cost may increase depending on the blending condition of materials.

BRIEF SUMMARY OF THE INVENTION

Accordingly, an object of the present invention is to provide a side gate type injection molding die that prevents a weld line from being generated on a molded component made of a resin material to which a brightening agent has been added to avoid inferior appearance, and to further provide a molded component manufacturing method using the above-mentioned side gate type injection molding die.

To achieve the object, the present invention provides a side gate type injection molding die including a product portion being a space for molding, and a side gate being used to inject a material into the product portion, wherein the side gate is formed so as to have a rectangular transverse cross section in a contact part between the product portion and the side gate, wherein the side gate is formed so as to extend from the contact part in the direction perpendicular to the transverse cross section of the contact part, at least one of corner parts of the transverse cross section formed into a rectangular shape in the contact part of the side gate is formed in a curved shape, and the resin material to which a brightening agent is added is injected into the product portion from the side gate to manufacture a molded component, and wherein the side gate is formed so that when the radius of curvature of the curved shape is taken as R, the gate height of the transverse cross section as h, and the gate width thereof as w, the relationship between the gate height h and the gate width w is h≦w, the ratio of the radius of curvature R to the gate height h is 0.25≦R/h≦0.75, and furthermore, the ratio of the transverse cross-sectional area to the transverse cross-sectional area in the case in which the curved shape is not provided in the corner part is not lower than 90%.

Also, the present invention provides a side gate type injection molding die including a product portion being a space for molding, and a side gate being used to inject a material into the product portion, wherein the side gate is formed so as to have a rectangular transverse cross section in a contact part between the product portion and the side gate, wherein the side gate is formed so as to extend from the contact part in the direction perpendicular to the transverse cross section of the contact part, at least one of corner parts of the transverse cross section formed into a rectangular shape in the contact part of the side gate is formed in a curved shape, and the resin material to which a brightening agent is added is injected into the product portion from the side gate to manufacture a molded component, wherein the side gate is formed so that when the radius of curvature of the curved shape is taken as R, the gate height of the transverse cross section as h, and the gate width thereof as w, the relationship between the gate height h and the gate width w is h≦w, the ratio of the radius of curvature R to the gate height h is 0.25≦R/h≦0.75, and furthermore, the ratio of the transverse cross-sectional area to the transverse cross-sectional area in the case in which the curved shape is not provided in the corner part, is not lower than 90%, and wherein the side gate is formed so that a parting line is provided along one side of the transverse cross section formed in the contact part of the side gate, and two corner parts formed by the side facing to the parting line and the sides intersecting the parting line are formed in the curved shape.

Furthermore, the present invention provides a side gate type injection molding die including a product portion being a space for molding, and a side gate being used to inject a material into the product portion, wherein the side gate is formed so as to have a rectangular transverse cross section in a contact part between the product portion and the side gate, wherein the side gate is formed so as to extend from the contact part in the direction perpendicular to the transverse cross section of the contact part, at least one of corner parts of the transverse cross section formed into a rectangular shape in the contact part of the side gate is formed in a curved shape, and the resin material to which a brightening agent is added is injected into the product portion from the side gate to manufacture a molded component, and wherein a parting line is provided along one side of the transverse cross section formed in the contact part of the side gate, and two corner parts formed by the side facing to the parting line and the sides intersecting the parting line are formed in the curved shape.

The present invention provides a molded component manufacturing method including a step of injecting a resin material to which a brightening agent is added from a side gate to a product portion by using a side gate type injection molding die, the side gate type injection molding die includes the product portion being a space for molding, and the side gate being used to inject the material into the product portion, wherein the side gate is formed so as to have a rectangular transverse cross section in a contact part between the product portion and the side gate, wherein the side gate is formed so as to extend from the contact part in the direction perpendicular to the transverse cross section of the contact part, and at least one of corner parts of the transverse cross section formed into a rectangular shape in the contact part of the side gate is formed in a curved shape, and wherein the side gate is formed so that when the radius of curvature of the curved shape is taken as R, the gate height of the transverse cross section as h, and the gate width thereof as w, the relationship between the gate height h and the gate width w is h≦w, the ratio of the radius of curvature R to the gate height h is 0.25≦R/h≦0.75, and furthermore, the ratio of the transverse cross-sectional area to the transverse cross-sectional area in the case in which the curved shape is not provided in the corner part is not lower than 90%.

Also, the present invention provides a molded component manufacturing method including a step of injecting a resin material to which a brightening agent is added from a side gate to a product portion by using a side gate type injection molding die, the side gate type injection molding die includes the product portion being a space for molding, and the side gate being used to inject the material into the product portion, wherein the side gate is formed so as to have a rectangular transverse cross section in a contact part between the product portion and the side gate, wherein the side gate is formed so as to extend from the contact part in the direction perpendicular to the transverse cross section of the contact part, and at least one of corner parts of the transverse cross section formed into a rectangular shape in the contact part of the side gate is formed in a curved shape, wherein the side gate is formed so that when the radius of curvature of the curved shape is taken as R, the gate height of the transverse cross section as h, and the gate width thereof as w, the relationship between the gate height h and the gate width w is h≦w, the ratio of the radius of curvature R to the gate height h is 0.25≦R/h≦0.75, and furthermore, the ratio of the transverse cross-sectional area to the transverse cross-sectional area in the case in which the curved shape is not provided in the corner part is not lower than 90%, and wherein the side gate is formed so that a parting line is provided along one side of the transverse cross section formed in the contact part of the side gate, and two corner parts formed by the side facing to the parting line and the sides intersecting the parting line are formed in the curved shape.

Furthermore, the present invention provides a molded component manufacturing method including a step of injecting a resin material to which a brightening agent is added from a side gate to a product portion by using a side gate type injection molding die, the side gate type injection molding die includes the product portion being a space for molding, and the side gate being used to inject the material into the product portion, wherein the side gate is formed so as to have a rectangular transverse cross section in a contact part between the product portion and the side gate, wherein the side gate is formed so as to extend from the contact part in the direction perpendicular to the transverse cross section of the contact part, and at least one of corner parts of the transverse cross section formed into a rectangular shape in the contact part of the side gate is formed in a curved shape, wherein the side gate is formed so that a parting line is provided along one side of the transverse cross section formed in the contact part of the side gate, and two corner parts formed by the side facing to the parting line and the sides intersecting the parting line are formed in the curved shape.

According to the present invention, the effects described below can be achieved. The present invention provides a side gate type injection molding die including a product portion being a space for molding, and a side gate being used to inject a material into the product portion, wherein the side gate is formed so as to have a rectangular transverse cross section in a contact part between the product portion and the side gate, wherein the side gate is formed so as to extend from the contact part in the direction perpendicular to the transverse cross section of the contact part, at least one of corner parts of the transverse cross section formed into a rectangular shape in the contact part of the side gate is formed in a curved shape, and the resin material to which a brightening agent is added is injected into the product portion from the side gate to manufacture a molded component, and wherein the side gate is formed so that when the radius of curvature of the curved shape is taken as R, the gate height of the transverse cross section as h, and the gate width thereof as w, the relationship between the gate height h and the gate width w is $h \leq w$, the ratio of the radius of curvature R to the gate height h is $0.25 \leq R/h \leq 0.75$, and furthermore, the ratio of the transverse cross-sectional area to the transverse cross-sectional area in the case in which the curved shape is not provided in the corner part is not lower than 90%. By using the die having the above-described feature, the molded component can be formed so that the weld line is prevented from being generated around a gate portion molded by the side gate without special blending in the resin material. Therefore, the composition of the resin material need not be changed, and a change in molding condition according to the change in composition of the resin material scarcely occurs. For this reason, the generation of the weld line can be prevented, without affecting the dimensional accuracy and the like in the die. Furthermore, the increase in cost caused by the use of resin material having a special composition can be prevented. In addition, since the cross-sectional area of the contact part of the side gate is sufficiently ensured, the filling amount of the resin material into the product portion does not decrease remarkably, and the molding condition of the die scarcely changes. As a result, the generation of the weld line can be prevented effectively while the generation of a short shot, a sink mark, and the like is prevented without affecting the dimensional accuracy and the like in the die.

The present invention provides a side gate type injection molding die including a product portion being a space for molding, and a side gate being used to inject a material into the product portion, wherein the side gate is formed so as to have a rectangular transverse cross section in a contact part between the product portion and the side gate, wherein the side gate is formed so as to extend from the contact part in the direction perpendicular to the transverse cross section of the contact part, at least one of corner parts of the transverse cross section formed into a rectangular shape in the contact part of the side gate is formed into a curved shape, and the resin material to which a brightening agent is added is injected into the product portion from the side gate to manufacture a molded component, wherein the side gate is formed so that when the radius of curvature of the curved shape is taken as R, the gate height of the transverse cross section as h, and the gate width thereof as w, the relationship between the gate height h and the gate width w is $h \leq w$, the ratio of the radius of curvature R to the gate height h is $0.25 \leq R/h \leq 0.75$, and furthermore, the ratio of the transverse cross-sectional area to the transverse cross-sectional area in the case in which the curved shape is not provided in the corner part is not lower than 90%, and wherein the side gate is formed so that a parting line is provided along one side of the transverse cross section formed in the contact part of the side gate, and two corner parts formed by the side facing to the parting line and the sides intersecting the parting line are formed in the curved shape. By using the die having the above-described feature, the molded component can be formed so that the weld line is prevented from being generated around the gate portion molded by the side gate without special blending into the resin material. Therefore, the composition of the resin material need not be changed, and a change in molding condition according to the change in composition of the resin material scarcely occurs. For this reason, the generation of the weld line can be prevented without affecting the dimensional accuracy and the like in the die. Furthermore, the increase in cost caused by the use of a resin material having a special composition can be prevented. In addition, since the cross-sectional area of the contact part of the side gate is sufficiently ensured, the filling amount of the resin material into the product portion does not decrease remarkably, and the molding condition of the die scarcely changes. As a result, the generation of the weld line can be prevented effectively while the generation of a short shot, a sink mark, and the like is prevented without affecting the dimensional accuracy and the like in the die. Also, the number of locations decreases at which the shape of the side gate changes, so that the cross-sectional area of the contact part of the side gate is further sufficiently ensured. Therefore, the filling amount of the resin material into the product portion does not decrease remarkably, and the molding condition of the die scarcely changes. As a result, the generation of the weld line can be prevented more effectively, and the generation of a short shot, a sink mark, and the like is prevented without affecting the dimensional accuracy and the like in the die.

The present invention provides a side gate type injection molding die including a product portion being a space for molding, and a side gate being used to inject a material into the product portion, wherein the side gate is formed so as to have a rectangular transverse cross section in a contact part between the product portion and the side gate wherein the side gate is formed so as to extend from the contact part in the direction perpendicular to the transverse cross section of the contact part, at least one of corner parts of the transverse cross section formed into a rectangular shape in the contact part of the side gate is formed in a curved shape; and the resin material to which a brightening agent is added is injected into the product portion from the side gate to manufacture a molded component, and wherein the side gate is formed that a parting line is provided along one side of the transverse cross section formed in the contact part of the side gate, and two corner parts formed by the side facing to the parting line and the sides intersecting the parting line are formed in the curved shape. By using the die having the above-described feature, the weld line can be prevented from being generated around the gate portion molded by the side gate without special blending in the resin material. Therefore, the composition of the resin material need not be changed, and a change in molding condition according to the change in composition of the resin material scarcely occurs. For this reason, the generation of the weld line can be prevented without affecting the dimensional accuracy and the like in the die. Furthermore, the increase in cost caused by the use of a resin material having a special composition can be prevented. In addition, the number of locations at which the shape of the side gate changes, decreases, so that the cross-sectional area of the contact part of the side gate is further sufficiently ensured. Therefore, the filling amount of the resin material into the product portion does not decrease remarkably, and the molding condition of the die scarcely changes. As a result, the generation of the weld line can be prevented more effectively and the generation of a short shot, a sink mark, and the like is prevented without affecting the dimensional accuracy and the like in the die.

The present invention provides a molded component manufacturing method including a step of injecting a resin material to which a brightening agent is added from a side gate to a product portion by using a side gate type injection molding die, the side gate type injection molding die includes the product portion being a space for molding, and the side gate being used to inject the material into the product portion wherein the side gate is formed so as to have a rectangular transverse cross section in a contact part between the product portion and the side gate, wherein the side gate is formed so as to extend from the contact part in the direction perpendicular to the transverse cross section of the contact part, and at least one of corner parts of the transverse cross section formed into a rectangular shape in the contact part of the side gate is formed in a curved shape, and wherein the side gate is formed so that when the radius of curvature of the curved shape is taken as R, the gate height of the transverse cross section as h, and the gate width thereof as w, the relationship between the gate height h and the gate width w is $h \leq w$, the ratio of the radius of curvature R to the gate height h is $0.25 \leq R/h \leq 0.75$, and furthermore, the ratio of the transverse cross-sectional area to the transverse cross-sectional area in the case in which the curved shape is not provided in the corner part is not lower than 90%. By using the die having the above-described feature, the weld line can be prevented from being generated around the gate portion molded by the side gate without special blending in the resin material. Therefore, the composition of the resin material is not restricted, and the shape, grain diameter, and addition amount of brightening agent can be selected according to the required bright appearance, metallic appearance, and the like, so that a molded component without the generation of weld line can be manufactured while the molded component has a painted surface which has a good appearance and a color tone with good metallic appearance. Also, since the weld line, which causes insufficient strength, is not generated, a shortage of strength of the molded component is eliminated. Furthermore, the increase in cost caused by the use of resin material having a special composition can be prevented. In addition, since the cross-sectional area of the contact part in the side gate can be sufficiently ensured, the molded component can be manufactured in the state in which the filling amount of resin material into the product portion of the die does not decrease greatly. Therefore, the generation of the weld line on the molded component can be prevented effectively, and the generation of a short shot, a sink mark, and the like is prevented.

The present invention provides a molded component manufacturing method including a step of injecting a resin material to which a brightening agent is added from a side gate to a product portion by using a side gate type injection molding die, the side gate type injection molding die includes the product portion being a space for molding, and the side gate being used to inject the material into the product portion, wherein the side gate is formed so as to have a rectangular transverse cross section in a contact part between the product portion and the side gate, the side gate is formed so as to extend from the contact part in the direction perpendicular to the transverse cross section of the contact part, and at least one of corner parts of the transverse cross section formed into a rectangular shape in the contact part of the side gate is formed in a curved shape, wherein the side gate is formed so that when the radius of curvature of the curved shape is taken as R, the gate height of the transverse cross section as h, and the gate width thereof as w, the relationship between the gate height h and the gate width w is $h \leq w$, the ratio of the radius of curvature R to the gate height h is $0.25 \leq R/h \leq 0.75$, and furthermore, the ratio of the transverse cross-sectional area to the transverse cross-sectional area in the case in which the curved shape is not provided in the corner part is not lower than 90%, and wherein the side gate is formed so that a parting line is provided along one side of the transverse cross section formed in the contact part of the side gate, and two corner parts formed by the side facing to the parting line and the sides intersecting the parting line are formed in the curved shape. By using the die having the above-described feature, the weld line can be prevented from being generated around the gate portion molded by the side gate without special blending in the resin material. Therefore, the composition of the resin material is not restricted, and the shape, grain diameter, and addition amount of brightening agent can be selected according to the required bright appearance, metallic appearance, and the like, so that a molded component without the generation of weld line can be manufactured while the molded component has a painted surface which has a good appearance and a color tone with good metallic appearance. Also, since the weld line, which causes insufficient strength, is not generated, a shortage of strength of the molded component is eliminated. Furthermore, the increase in cost caused by the use of resin material having a special composition can be prevented. In addition, since the cross-sectional area of the contact part of the side gate can be secured sufficiently, the molded component can be manufactured in the state in which the filling amount of resin material into the product portion of the die does not decrease greatly. Therefore, the generation of the weld line on the molded component can be prevented effectively, and the generation of a short shot, a sink mark, and the like is prevented. Also, since the number of locations at which the shape of the side gate changes decreases, the cross-sectional area of the contact part of the side gate can be secured further sufficiently. Therefore, the molded component can be manufactured in the state in which the filling amount of resin material into the product portion of the die does not decrease greatly. As a result, the generation of the weld line on the molded component can be prevented more effectively, and the generation of a short shot, a sink mark, and the like is prevented.

The present invention provides a molded component manufacturing method including a step of injecting a resin material to which a brightening agent is added from a side gate to a product portion by using a side gate type injection molding die, the side gate type injection molding die includes the product portion being a space for molding, and the side gate being used to inject the material into the product portion, wherein the side gate is formed so as to have a rectangular transverse cross section in a contact part between the product portion and the side gate, the side gate is formed so as to extend from the contact part in the direction perpendicular to the transverse cross section of the contact part, and at least one of corner parts of the transverse cross section formed into a rectangular shape in the contact part of the side gate is formed in a curved shape, and wherein the side gate is formed so that a parting line is provided along one side of the transverse cross section formed in the contact part of the side gate, and two corner parts formed by the side facing to the parting line and the sides intersecting the parting line are formed in the curved shape. By using the die having the above-described feature, the weld line can be prevented from being generated around the gate portion molded by the side gate without special blending in the resin material. Therefore, the composition of the resin material is not restricted, and the shape, grain diameter, and addition amount of brightening agent can be selected according to the required bright appearance, metallic appearance, and the like, so that a molded component without the generation of weld line can be manufactured while the molded component has painted surface which has a good appearance and a color tone with good metallic appearance. Also, since the weld line, which causes insufficient strength, is not generated, a shortage of strength of the molded component is eliminated. Furthermore, the increase in cost caused by the use of resin material having a special composition can be prevented. In addition, the number of locations decreases at which the shape of the side gate changes, so that the cross-sectional area of the contact part of the side gate can be further sufficiently ensured. Therefore, the molded component can be manufactured in the state in which the filling amount of resin material into the product portion of the die does not decrease greatly. As a result, the generation of the weld line on the molded component can be prevented more effectively, and the generation of a short shot, a sink mark, and the like is prevented.

DETAILED DESCRIPTION OF THE INVENTION

The present invention now will be described more fully hereinafter in which embodiments of the invention are provided with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise.

Unless otherwise defined, all technical and scientific terms used herein have the same meaning as commonly understood by one of ordinary skill in the art to which this invention belongs.

Hereinafter, preferred embodiments of the present invention will be described. However, it is to be understood that the present invention is not limited thereto.

An embodiment of the present invention will now be described in detail with reference to the accompanying drawings.

The present invention is intended for the manufacture of a molded component having metallic appearance and bright appearance, and is mainly intended for the manufacture of a vehicle design part. The embodiment of the present invention may be applied to an interior door handle 1 (hereinafter referred to as a "door handle") provided in the interior of a door (not shown) in a cabin of a vehicle. This door handle 1 is explained below.

Figure 1:
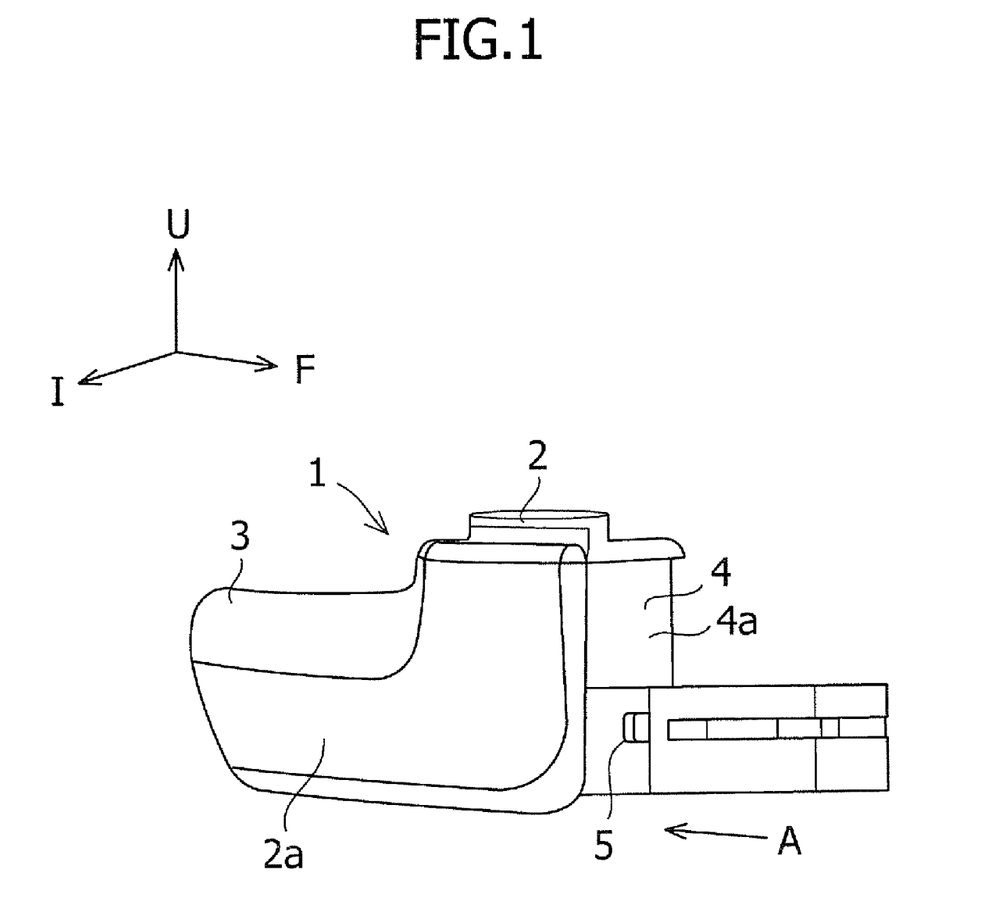
FIG. 1 is a schematic view of a door handle in an embodiment of the present invention.

FIG. 1 schematically shows the door handle 1 in the embodiment of the present invention. As shown in FIG. 1, the front-side direction of door is indicated by F, the upper-side direction of door by U, and the cabin inside direction by 1. The door handle 1 has a metallic-tone appearance, and is manufactured of a resin material to which a brightening agent is added. Also, the door handle 1 includes a body portion 2, and the body portion 2 includes a handle part 3 to be gripped by an occupant when the door is opened or closed, and an attachment part 4 for attaching the door handle 1 to the door. The handle part 3 is formed into a shape extending in the front and rear direction of door, and the attachment part 4 is arranged on the front side of the handle part 3 in the front and rear direction of door. The entirety of the outer surface of the handle part 3 and the surface on the cabin inside of the attachment part 4 are located at a position at which these surfaces can be seen by the passenger, and are configured as a design surface 2a of the body portion 2 which must maintain an excellent appearance.

For injection molding the door handle 1, a gate portion 5 serving as a passage through which the resin material passes, is provided so as to extend from a front-side part 4a of the attachment part 4 toward the front-side direction F of the door. The injection direction of the resin material is indicated by the arrow A. The gate portion 5 is cut after molding, and a part of the gate portion 5 is in a state of remaining on the body portion 2 as a so-called gate remnant. Since this gate remnant degrades the appearance, the gate portion 5 is usually arranged at a location distant from the design surface 2a. Therefore, the gate portion 5 is arranged in the front-side part 4a of the attachment part 4 in the front and rear direction of door, and is also arranged close to the lower side of the front-side part 4a in the up and down direction of door.

Figure 2:
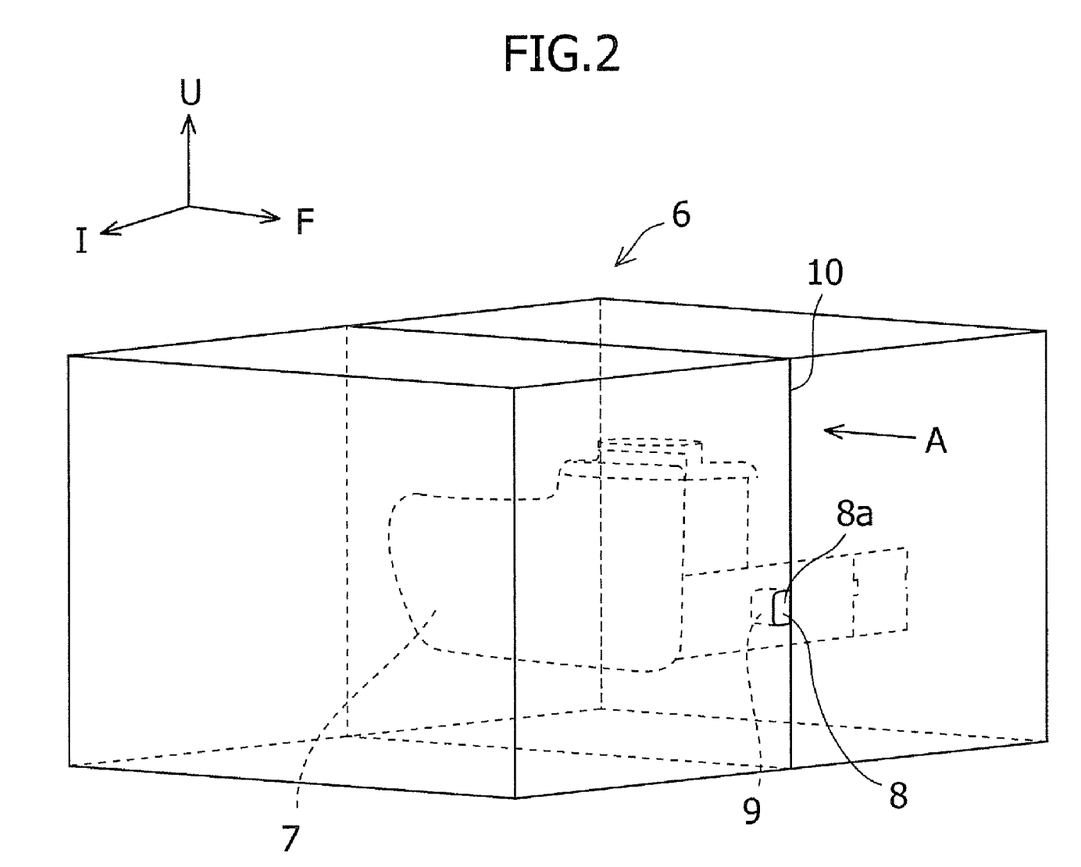
FIG. 2 is a schematic view of a door handle die in an embodiment of the present invention.

A side gate type injection molding die 6 for molding the above-described door handle 1 (hereinafter referred to as a "door handle die") is configured as shown in FIG. 2. In FIG. 2, the door handle die 6 includes a product portion 7 and a side gate 8. The product portion 7 is formed so as to include a space having almost the same shape as that of the body portion 2 of the door handle 1, and the side gate 8 is formed so as to include a space having almost the same shape as that of the gate portion 5 of the door handle 1. Therefore, the explanation of the door handle die 6 is given according to the direction of the door handle 1.

The door handle die 6 is configured so that the body portion 2 of the door handle 1 is molded by the product portion 7, and the gate portion 5 of the door handle 1 is molded by the side gate 8. Also, the side gate 8 is connected to the product portion 7 by a contact part 9. The door handle die 6 is provided with a parting line 10 along a vehicle outside surface 8a of the side gate 8, and the door handle die 6 is divided by the parting line 10.

Figure 3:
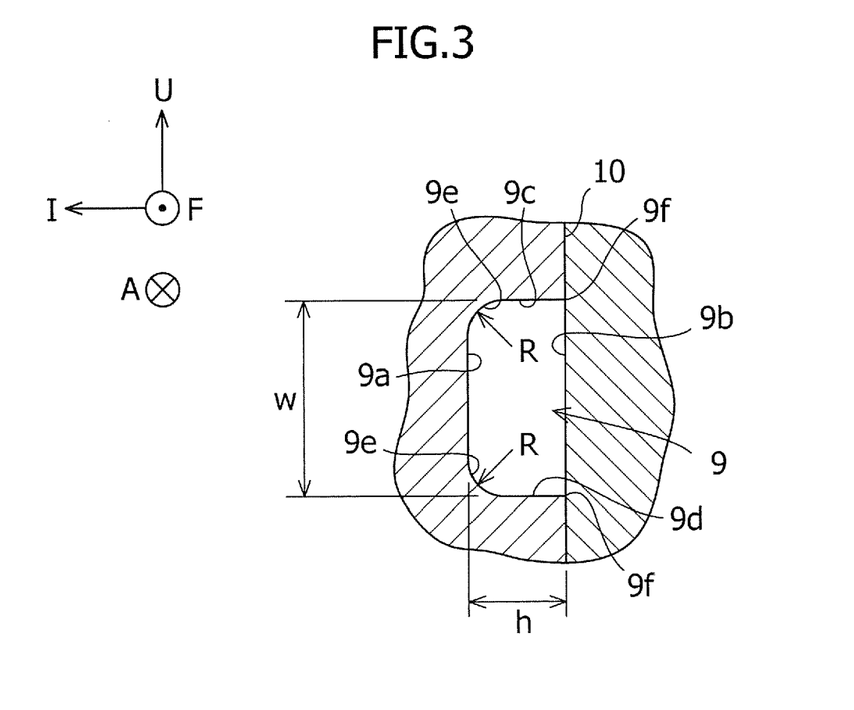
FIG. 3 is a transverse sectional view of a contact part of a side gate and a body portion in a door handle die of an embodiment of the present invention.

FIG. 3 shows a transverse cross section of the contact part 9 in the side gate 8. The transverse cross section of the contact part 9 is formed into a substantially rectangular shape by a cabin inner side 9a, a cabin outer side 9b, an upper side 9c, and a lower side 9d. Also, the cabin outer side 9b is provided along the parting line 10. Therefore, the cabin inner side 9a is opposed to the parting line 10, and the upper side 9c and the lower side 9d intersect with the parting line 10. As for the dimensions of this substantially rectangular shape, a gate height h, which is the distance between the cabin inner side 9a and the cabin outer side 9b, is 2.0 mm, a gate width w, which is the distance between the upper side 9c and the lower side 9d, is 5.0 mm, and the relationship between the gate height h and the gate width w is h≦w.

Two corner parts 9e are formed by the cabin inner side 9a and the upper and lower sides 9c and 9d, and each of the two corner parts 9e is formed in a curved shape having a radius of curvature R equal to 0.5 mm. That is to say, the ratio R/h of the radius of curvature R to the gate height h is 0.05. On the other hand, two parting line-side corner parts 9f are formed by the cabin outer side 9b and the upper and the lower sides 9c and 9d.

Next, a method for manufacturing the door handle 1 by using the door handle die 6 is explained. From an injection unit (not shown), the resin material to which the brightening agent is added, passes through the side gate 8 in a molten fluid condition. Thereafter, the resin material is injected into the product portion 7 at a predetermined injection speed and injection pressure. The injected resin material is filled into the product portion 7 and the side gate 8, and is held at a predetermined pressure and temperature in the product portion 7 and the side gate 8. After the resin material has been cooled further during a predetermined period of time, the door handle 1 is taken out of the door handle die 6.

When the door handle 1 is injection molded by using the above-described door handle die 6, the result that no weld line L originates from any of the corner parts 9e and 9f of the gate portion 5 in the door handle 1, can be obtained.

By the use of the door handle die 6 having the above-described feature, the weld line L can be prevented from being generated around the gate portion 5 of the door handle 1 without special blending into the resin material. Therefore, the composition of resin material need not be changed, and a change in molding condition due to the change in composition of the resin material scarcely occurs. For this reason, the generation of the weld line L can be prevented without affecting the dimensional accuracy and the like of the door handle die 6. Furthermore, the increase in cost caused by the use of a resin material having a special composition can be prevented.

Also, since only the two corner parts 9e are formed in a curved shape, the number of locations decreases at which the shape of the side gate 8 changes, so that the cross-sectional area of the contact part 9 in the side gate 8 is secured more sufficiently. Therefore, the filling amount of resin material into the product portion 7 does not decrease remarkably, and the molding condition of the door handle die 6 scarcely changes. As a result, the generation of the weld line L can be prevented more effectively, and the generation of a short shot, a sink mark, and the like is prevented without affecting the dimensional accuracy and the like of the door handle die 6.

For the door handle 2 manufactured by using the above-described door handle die 6, the generation of the weld line L around the gate portion 5 of the door handle 1 can be prevented without special blending into the resin material. For this reason, the composition of resin material is not restricted, so that the shape, grain diameter, and addition amount of brightening agent can be selected according to the required bright appearance, metallic appearance, and the like. Therefore, the door handle 1 without the generation of weld line while having painted surface which has a good appearance and a color tone with good metallic appearance, can be manufactured. Also, since the weld line L, which causes insufficient strength, is not generated, a shortage of strength of the door handle 1 is eliminated. Furthermore, the increase in cost caused by the use of resin material having a special composition can be prevented.

Also, since only the two corner parts 9e are formed in a curved shape, the number of locations at which the shape of the side gate 8 changes, decreases. For this reason, the cross-sectional area of the contact part 9 of the side gate 8 is secured more sufficiently, so that the door handle 1 can be manufactured in the state in which the filling amount of resin material into the product portion 7 of the door handle die 6 does not decrease greatly. Therefore, the generation of the weld line L on the door handle 1 can be prevented further effectively, and the generation of a short shot, a sink mark, and the like is prevented.

In the door handle die 6, the ratio R/h of the radius of curvature R in the corner parts 9e to the gate height h is 0.05. In the case in which this value is changed, a check is made as to whether or not the weld line L is generated around the gate portion 5.

Figure 4:
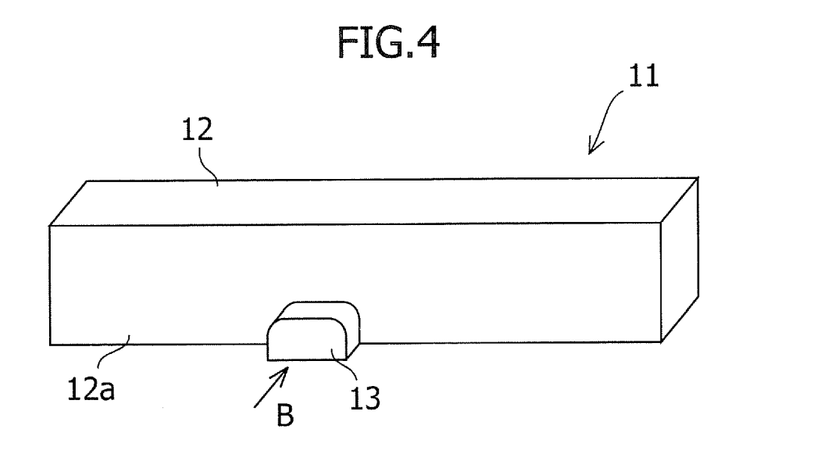
FIG. 4 is a schematic view of a test piece in an embodiment of the present invention.

To perform this check, a test piece 11 as shown in FIG. 4 is used. The test piece 11 is made of the resin material to which the brightening agent is added, and is used to evaluate the injection molding method intended to manufacture a molded component having a component weight of about 2 to 100 g. The test piece 11 includes a body portion 12 and a gate portion 13. Also, the test piece 11 is made by injecting the resin material into the body portion 12 through the gate portion 13. The injection direction of the resin material is indicated by the arrow B. Furthermore, the body portion 12 is formed substantially into a rectangular parallelepiped that is long sideways in the direction perpendicular to the injection direction B. The explanation of the test piece 11 is given by taking the lengthwise direction of the body portion 12 as the right and left direction, and additionally by taking the direction that is perpendicular to the injection direction indicated by the arrow B and also perpendicular to the right and left direction as the up and down direction.

The body portion 12 is provided with a gate-side surface 12a located on the front side in the injection direction B, and the gate portion 13 of the test piece 11 is formed so as to extend in the direction opposed to the injection direction B from the gate-side Surface 12a. Also, the gate portion 13 is arranged at the lower end in the substantially central part in the right and left direction of the gate side surface 12a.

Figure 5:
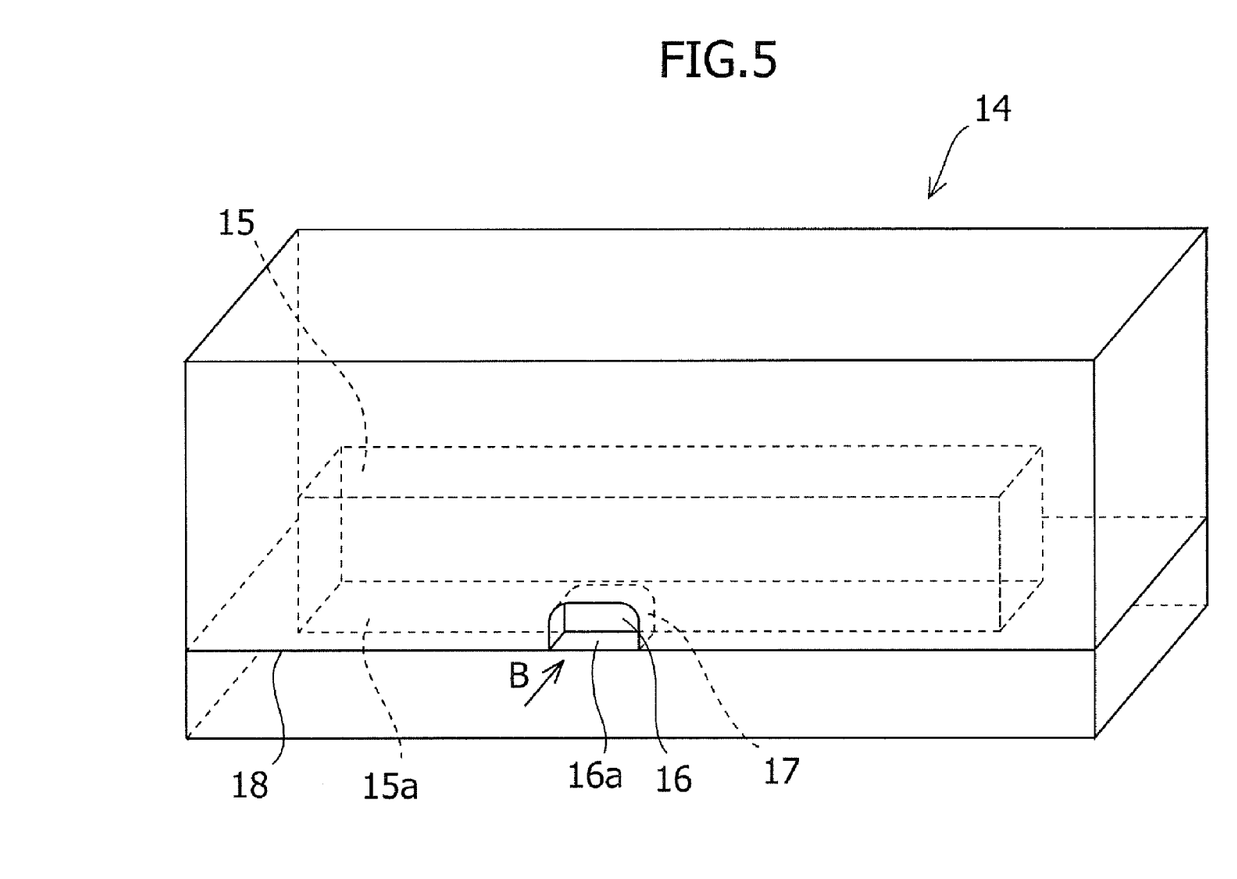
FIG. 5 is a schematic view of a test piece die in an embodiment of the present invention.

FIG. 5 shows a side gate type injection molding die 14 (hereinafter referred to as a "test piece die") for manufacturing the above-described test piece 11. The test piece die 14 includes a product portion 15 and a side gate 16. The product portion 15 is formed so as to include a space having almost the same shape as that of the body portion 12 of the test piece 11, and the side gate 16 is formed so as to include a space having almost the same shape as that of the gate portion 13 of the test piece 11. Therefore, the explanation of the test piece die 14 is given according to the directions for the test piece 11.

The test piece die 14 is configured so that the body portion 12 of the test piece 11 is molded by the product portion 15 and the gate portion 13 of the test piece 11 is molded by the side gate 16. Also, the side gate 16 has a contact part 17 by which the side gate 16 is connected to the product portion 15. For the test piece die 14, a lower surface 15a of the product portion 15, and a lower surface 16a of the side gate 16 are configured as an approximately equal plane, and a parting line 18 is provided along the lower surface 15a of the product portion 15 and the lower surface 16a of the side gate 16 so that the test piece die 14 is divided by the parting line 18.

Figure 6:
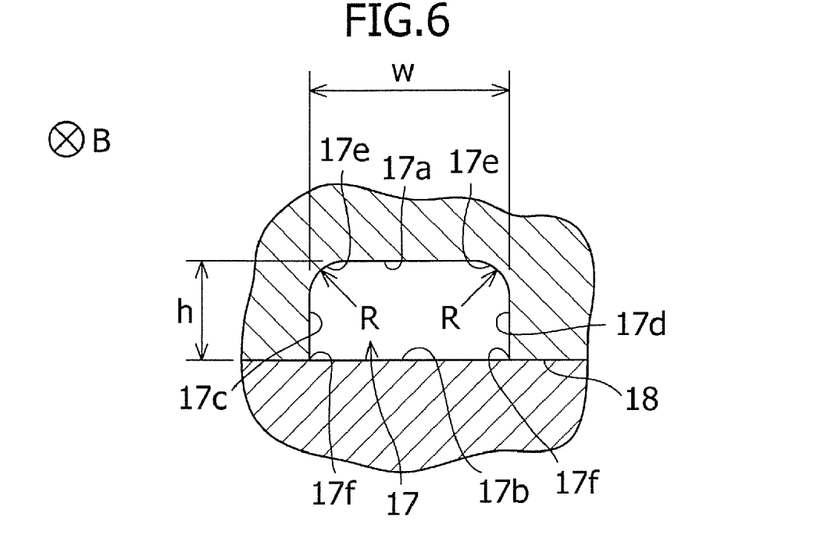
FIG. 6 is a transverse sectional view of a contact part of a side gate and a body portion in a test piece die of an embodiment of the present invention.

FIG. 6 shows a transverse cross section of the contact part 17 of the side gate 16. The transverse cross section of the contact part 17 is explained with reference to FIG. 6. The transverse cross section of the contact part 17 is formed into a substantially rectangular shape by an upper side 17a, a lower side 17b, a left side 17c, and a right side 17d. Also, the lower side 17b is provided along the parting line 18. Therefore, the upper side 17a is opposed to the parting line 18, and the left side 17c and the right-side side 17d intersect the parting line 18. The side gate type injection molding die for generally injection molding a molded component which has a component weight of about 2 to 100 g, is formed so that the transverse cross-sectional area is 3 to 12 mm². Based on this fact, in the embodiment of the present invention, a gate height h, which is the distance between the upper side 17a and the lower side 17b, is 2.0 mm, a gate width w, which is the distance between the left side 17c and the right side 17d, is 5.0 mm, the transverse cross-sectional area is about 10 mm², and the relationship between the gate height h and the gate width w is h≦w.

Two corner parts 17e are formed by the upper side 17a and the left and right sides 17c and 17d, and each of the two corner parts 17e is formed in a curved shape having a radius of curvature R. On the other hand, two parting line-side corner parts 17f are formed by the lower side 17b, the left side 17c, and the right side 17d.

When the test piece 11 is made by using the test piece die 14, from an injection unit (not shown), the resin material to which the brightening agent is added, passes through the side gate 16 in a molten fluid condition. Thereafter, the resin material is injected into the product portion 15 at a predetermined injection speed and injection pressure. The injected resin material is filled into the product portion 15 and the side gate 16, and is held at a predetermined pressure and temperature in the product portion 15 and the side gate 16. After the resin material has been cooled further for a predetermined period of time, the test piece 11 is taken out of the test piece die 14.

On the test piece 11 made as described above and the test piece die 14, by changing the radius of curvature R of the curved shape, a check was made as to whether or not the generation of the weld line L extending radially from the gate portion 13 to the body portion 12 could be prevented. The specifications of a molding machine used for this check are given in Table 1.

TABLE 1

| | |
|---|---|
| Maximum injection pressure | 191 MPa |
| Maximum injection speed | 147 cm³/sec |
| Maximum injection stroke | 160 mm |
| Screw diameter | 42.6 mm |
| Clamping force | 130 ton |

When the injection molding was performed, the injection speed was set at 5% or 95%, and the injection pressure was set at 75% or 95%. Also, as the resin material used for this check, AES resin and aluminum pigment which has an average grain diameter of 5 μm, were used. Generally, the average grain diameter of the aluminum pigment is 5 to 120 μm, and it is said that the smaller the average grain diameter, the more conspicuous the weld line L. Therefore, in this check, the smallest average grain diameter was selected, and whether or not the generation of the weld line L could be reliably prevented was checked.

In addition, the radius of curvature R was changed to 0.0 mm, 0.3 mm, 0.5 mm, 1.0 mm, 1.5 mm and 2.0 mm. If these values are converted into the ratios R/h, which are the ratios of the radius of curvature R to the gate height h (=2.0 mm) of the transverse cross section, the ratios R/h are 0.00, 0.15, 0.25, 0.50, 0.75 and 1.00. The check for the generation of the weld line L was made by visual inspection of the taken out test piece 11. The check was made under the above conditions, and the obtained results are given in Table 2.

TABLE 2

| R/h | Injection speed | Injection pressure | Weld line |
|---|---|---|---|
| 0.00 | 5% | 75% | Present |
| | 5% | 95% | Present |
| | 90% | 75% | Present |
| | 90% | 95% | Present |
| 0.15 | 5% | 75% | Slight |
| | 5% | 95% | Slight |
| | 90% | 75% | Slight |
| | 90% | 95% | Slight |
| 0.25 | 5% | 75% | Absent |
| | 5% | 95% | Absent |
| | 90% | 75% | Absent |
| | 90% | 95% | Absent |
| 0.50 | 5% | 75% | Absent |
| | 5% | 95% | Absent |
| | 90% | 75% | Absent |
| | 90% | 95% | Absent |
| 0.75 | 5% | 75% | Absent |
| | 5% | 95% | Absent |
| | 90% | 75% | Absent |
| | 90% | 95% | Absent |
| 1.00 | 5% | 75% | Absent |
| | 5% | 95% | Absent |
| | 90% | 75% | Absent |
| | 90% | 95% | Absent |

A results described below were obtained. As seen from Table 2, in the case in which the value of R/h is not smaller than 0.25, the weld line L is not generated. Therefore, the generation of the weld line L around the gate portion can be prevented by the injection molding die, such as the door handle die 6 and the test piece die 14, having the side gate feature of the ratio R/h not lower than 0.25.

On the other hand, the door handle 1 has a problem in that when the above-mentioned radius of curvature R is increased, the transverse cross-sectional area of the side gate 8 decreases. In this case, the quantity of resin material that passes through the side gate 8 and is injected into the product portion 7 is restricted, which may become a cause for a short shot, a sink mark, and the like. Therefore, it is desirable that the ratio of the transverse cross-sectional area having curved shapes in the corner parts 9e to the transverse cross-sectional area having no curved shapes in the corner parts 9e be not less than 90%. This ratio was calculated, and the calculation result is given in Table 3. In this calculation, assuming the case in which the gate height h is 2.0 mm and the gate width w is 5.0 mm, the ratio of the gate height h to the gate width w was set at 2:5. Also, the calculation was made for the case in which the ratio R/h, which is the ratio of the radius of curvature R to the gate height h of the transverse cross section, were 0.15, 0.25, 0.50, 0.75 and 1.00.

TABLE 3

| R/h | Ratio of cross-sectional area of gate portion With curved shapes/without curved shapes (In the case in which h:w = 2:5) |
|---|---|
| 0.15 | 99.61% |
| 0.25 | 98.93% |
| 0.50 | 95.70% |
| 0.75 | 90.33% |
| 1.00 | 82.80% |

As seen from Table 3, for the gate having a cross-sectional shape in which the ratio of the gate height h to the gate width w is 2:5, in the case in which the value of R/h is not larger than 0.75, the ratio of the cross-sectional area having curved shapes to the transverse cross-sectional area having no curved shapes of not less than 90% can be secured. Therefore, the value of R/h is preferably not larger than 0.75, and furthermore, is preferably not smaller than 0.25 and not larger than 0.75. Furthermore, even in the case in which the ratio h:w has various values, the value of R/h should be determined so that the transverse cross-sectional area of the side gate 8 of not smaller than 90% can be secured.

In the door handle die 6 in which the value of R/h is determined so as to be in this range, the cross-sectional area of the side gate 8 is secured sufficiently. Therefore, the filling amount of resin material into the product portion 7 does not decrease remarkably, and the molding condition of the door handle die 6 scarcely changes. As a result, the generation of the weld line L can be prevented effectively, and the generation of a short shot, a sink mark, and the like is prevented without affecting the dimensional accuracy and the like in the door handle die 6.

Furthermore, for the door handle 1 manufactured by using the door handle die 6 in which the value of R/h is determined so as to be in the above-described range, the cross-sectional area of the side gate 8 can be sufficiently ensured, so that the door handle 1 can be manufactured in the state in which the filling amount of resin material into the product portion 7 of the door handle die 6 does not decrease greatly. Therefore, the generation of the weld line L on the door handle 1 can be prevented effectively, and the generation of a short shot, a sink mark, and the like is prevented.

As another embodiment of the present invention, the contact part of a side gate can have a feature in which the transverse cross section thereof has the curved shape in one, three, or four corner parts. Even in the case in which the location at which the weld line L is generated is changed by the feature of die, the generation of the weld line L can be prevented effectively.

As still another embodiment of the present invention, the die in accordance with the present invention can be applied to a molded component having a component weight heavier than about 100 g, so that it can be applied to various molded components.

The above is a description of the embodiments of the present invention. The present invention is not limited to the above-described embodiments, and various modifications and changes can be made based on the technical concept of the present invention.

What is claimed is:

1. A side gate type injection molding die comprising:
a product portion being a space for molding; and
a side gate being used to inject a material into the product portion;
wherein the side gate is formed so as to have a rectangular transverse cross section in a contact part between the product portion and the side gate;
wherein the side gate is formed so as to extend from the contact part in the direction perpendicular to the transverse cross section of the contact part, at least one of corner parts of the transverse cross section formed into a rectangular shape in the contact part of the side gate is formed in a curved shape, and the resin material to which a brightening agent is added is injected into the product portion from the side gate to manufacture a molded component; and
wherein the side gate is formed so that when the radius of curvature of the curved shape is taken as R, the gate height of the transverse cross section as h, and the gate width thereof as w, the relationship between the gate height h and the gate width w is h≦w, the ratio of the radius of curvature R to the gate height h is 0.25≦R/h≦0.75, and furthermore, the ratio of the transverse cross-sectional area to the transverse cross-sectional area in the case in which the curved shape is not provided in the corner part is not lower than 90%.

2. A side gate type injection molding die comprising:
a product portion being a space for molding; and
a side gate being used to inject a material into the product portion;
wherein the side gate is formed so as to have a rectangular transverse cross section in a contact part between the product portion and the side gate;
wherein the side gate is formed so as to extend from the contact part in the direction perpendicular to the transverse cross section of the contact part, at least one of corner parts of the transverse cross section formed into a rectangular shape in the contact part of the side gate is formed in a curved shape, and the resin material to which a brightening agent is added is injected into the product portion from the side gate to manufacture a molded component;
wherein the side gate is formed so that when the radius of curvature of the curved shape is taken as R, the gate height of the transverse cross section as h, and the gate width thereof as w, the relationship between the gate height h and the gate width w is h≦w, the ratio of the radius of curvature R to the gate height h is 0.25≦R/h≦0.75, and furthermore, the ratio of the transverse cross-sectional area to the transverse cross-sectional area in the case in which the curved shape is not provided in the corner part is not lower than 90%; and
wherein the side gate is formed so that a parting line is provided along one side of the transverse cross section formed in the contact part of the side gate, and two corner parts formed by the side facing to the parting line and the sides intersecting the parting line are formed in the curved shape.

3. A molded component manufacturing method comprising a step of injecting a resin material to which a brightening agent is added from a side gate to a product portion by using a side gate type injection molding die, the side gate type injection molding die comprising:
the product portion being a space for molding; and
the side gate being used to inject the material into the product portion;
wherein the side gate is formed so as to have a rectangular transverse cross section in a contact part between the product portion and the side gate;
wherein the side gate is formed so as to extend from the contact part in the direction perpendicular to the transverse cross section of the contact part, at least one of corner parts of the transverse cross section formed into a rectangular shape in the contact part of the side gate is formed in a curved shape; and wherein the side gate is formed so that when the radius of curvature of the curved shape is taken as R, the gate height of the transverse cross section as h, and the gate width thereof as w, the relationship between the gate height h and the gate width w is $h \leqq w$, the ratio of the radius of curvature R to the gate height h is $0.25 \leqq R/h \leqq 0.75$, and furthermore, the ratio of the transverse cross-sectional area to the transverse cross-sectional area in the case in which the curved shape is not provided in the corner part is not lower than 90%.

4. A molded component manufacturing method comprising a step of injecting a resin material to which a brightening agent is added from a side gate to a product portion by using a side gate type injection molding die, the side gate type injection molding die comprising:

the product portion being a space for molding; and the side gate being used to inject the material into the product portion;

wherein the side gate is formed so as to have a rectangular transverse cross section in a contact part between the product portion and the side gate;

wherein the side gate is formed so as to extend from the contact part in the direction perpendicular to the transverse cross section of the contact part, and at least one of corner parts of the transverse cross section formed into a rectangular shape in the contact part of the side gate is formed in a curved shape;

wherein the side gate is formed so that when the radius of curvature of the curved shape is taken as R, the gate height of the transverse cross section as h, and the gate width thereof as w, the relationship between the gate height h and the gate width w is $h \leqq w$, the ratio of the radius of curvature R to the gate height h is $0.25 \leqq R/h \leqq 0.75$, and furthermore, the ratio of the transverse cross-sectional area to the transverse cross-sectional area in the case in which the curved shape is not provided in the corner part is not lower than 90%; and wherein the side gate is formed so that a parting line is provided along one side of the transverse cross section formed in the contact part of the side gate, and two corner parts formed by the side facing to the parting line and the sides intersecting the parting line are formed in the curved shape.

* * * * *